United States Patent [19]
Heath et al.

[11] Patent Number: 5,559,652
[45] Date of Patent: Sep. 24, 1996

[54] DISK DRIVE ROTARY ACTUATOR WITH ROCKING PIVOT

[76] Inventors: John S. Heath, 34 Olivers Battery Rd. North, Winchester Hants SO22 4JB; Michael R. Hatchett, 31 Westwood Gardens, Chandlers Ford Hants SO5 IFN, both of England

[21] Appl. No.: 528,861

[22] Filed: Sep. 15, 1995

Related U.S. Application Data

[63] Continuation of Ser. No. 383,697, Feb. 1, 1995, abandoned, which is a continuation of Ser. No. 110,710, Aug. 23, 1993, abandoned.

[51] Int. Cl.[6] .............................. G11B 5/55; G11B 21/08
[52] U.S. Cl. ............................................ 360/106; 360/104
[58] Field of Search ................................ 360/106, 104, 360/99.08, 97.02

[56] References Cited

U.S. PATENT DOCUMENTS

| | | | |
|---|---|---|---|
| 3,849,800 | 11/1974 | Cuzner et al. | 360/97.08 |
| 4,860,137 | 8/1989 | Shtipelman | 360/106 |
| 4,879,617 | 11/1989 | Sampietro et al. | 360/106 |
| 4,995,025 | 2/1991 | Schulze | 360/106 X |
| 5,029,030 | 7/1991 | Luecke | 360/106 |
| 5,117,318 | 5/1992 | Immler et al. | 360/106 |
| 5,130,959 | 7/1992 | Wakatsuki et al. | 369/77.2 |
| 5,136,446 | 8/1992 | Yamamoto et al. | 360/106 |
| 5,161,077 | 11/1992 | Jabbari | 360/106 |
| 5,355,268 | 10/1994 | Schulze | 360/106 |

FOREIGN PATENT DOCUMENTS 1342495  1/1974  United Kingdom .

OTHER PUBLICATIONS

Heath JS Design of a Swinging Arm Actuator for a Disk File. IBM J Res and Dev. Jul. 1976.

*Primary Examiner*—John H. Wolff
*Attorney, Agent, or Firm*—Rothwell, Figg, Ernst & Kurz

[57] ABSTRACT

A disk drive rotary actuator with a rocking pivot allowing limited angular rotation of an actuator arm assembly. A surface (34) fixed to the arm 16 rocks on fixed surface (32) held in contact by a spring (50). Second rocking surfaces are also provided on the rotational axis. A flexure leaf (40) connects the arm (16) to the disk drive base to provide positional stability. The rocking pivot actuator has advantages of simplicity, and improved frictional characteristics. A flexible circuit connection may pass through the pivot.

13 Claims, 10 Drawing Sheets

DISK DRIVE ROTARY ACTUATOR WITH ROCKING PIVOT

This is a continuation of application Ser. No. 08/383,697, filed Feb. 1, 1995, now abandoned which is a continuation of application Ser. No. 08/110,710, filed Aug. 23, 1993 now abandoned.

BACKGROUND OF THE INVENTION

1. Field of the Invention

This invention relates generally to rotary actuators for disk drives and in particular to pivot bearings which allow rotation through a limited angle.

2. Description of Prior Art

It is well known to employ rotary actuators for positioning magnetic transducers (heads) of a magnetic disk memory medium over selected information bearing tracks on the disk(s). British Patent 1,342,495 issued to D. E. Cuzner et al. on Jan. 3, 1974 and titled "Transducer arms for magnetic disc recording and/or reproducing apparatus" first teaches such an actuator for a single disk. U.S. Pat. No. 3,849,800 also teaches the same. This actuator arm is claimed as being angularly moveable and described as being rotatably mounted on a shaft by a bearing. The application of a rotary actuator to multiple disks is first described in the IBM Technical Disclosure Bulletin Vol. 16 No. 10, March 1974, by D. E. Cuzner et al. This teaches a single rotating arm comprising multiple legs which interleave a stack of disks. The arm is described as being pivoted on a shaft carried by bearings which are housed in a clamping structure. Because the movement of the transducers has to be controlled with great precision by a servo system, it is necessary that the actuator should have a small frictional resistance to rotation, while at the same time have no looseness or backlash due to clearances in the pivot bearings. For the same reason it is also necessary that the arm structure, including the pivot, should be free of resonant vibrational modes which could effect the stability of the servo system. An article by J.S. Heath in the IBM Journal of Research and Development (July 1976, pages 389 to 397) describes the basic operation of the rotary actuator and the requirements of the servo system to ensure satisfactory operation. This article describes a pivot system using needle roller bearings with spring loaded inserts to remove radial clearance. Such a bearing system is only possible because in disk drive rotary actuators the total angular range of movement necessary to move the recording transducers across all the tracks is limited to about thirty degrees.

The great majority of rotary actuators that have been produced however employ normal deep groove or angular contact ball bearings to form the pivot. These standard bearings are freely available and can be arranged to provide most of the necessary mechanical properties. In order to remove internal clearance it is necessary to use a pair of bearings assembled on a single shaft. The bearings are positioned so that each exerts a small axial force on the other. This force eliminates the internal clearances of the bearings. The force has to be adjusted carefully to provide adequate dynamic properties yet without increasing the frictional resistance to rotation (torque) of the assembly to an unacceptable extent. This frictional torque arises from the fact that there are many points of contact in a pair of ball bearings, typically between 24 and 32 depending on the number of balls. There is also a large ratio between the rotational velocity of the balls and that of the arm rotation. The net effect is that the frictional forces between the balls and the surfaces of the races on which they roll, which are naturally very small indeed, are greatly amplified and add together to produce a significant frictional resistance to rotation of the assembly. It is a characteristic of this friction that it is very variable as it depends upon the history of prior rotational movement of the pivot. A word that describes this form of frictional behavior is "hysteretic."

It is possible to design a servo to mitigate some of the effects of frictional influences on the motion and positional accuracy of the controlled element, the recording head. Methods are described in U.S. Pat. No. 4,536,809 issued on Aug. 20, 1985 to M. Sidman and entitled "Adaptive Misposition Correcting Method and Apparatus for Magnetic Disk Servo Systems" and also in an article by M. D. Sidman entitled "Control Systems Technology in Digital's Disk Drives" published in the Digital Technical Journal No. 8, February 1989. In this article the unwanted torque is referred to as bias. It is explained that the friction forces must be stable and predictable for this adaptive control method to be effective. This is not the case with the friction that is experienced in the ball bearing pivot systems normally employed in actuators. It will be appreciated that in order to increase the total information that can be stored in a disk drive, it is beneficial to increase the density of storage of the data on the disks, and that one way to accomplish this is to space the information tracks more closely. To do this demands that the accuracy of the mechanism and servo have to be improved. So for the reasons explained above, the ball bearing pivot places limitations on the density of the recorded tracks in a storage device.

The use of a pair of ball bearings as a disk drive pivot also limits the dynamic characteristics of the actuator mechanism. This is because of the demands of accuracy that are made by ball bearings. Firstly the outer race rings of the bearings themselves are relatively massive as they are made of steel and require to be strong enough to maintain a very high roundness accuracy. Then the housings into which the races are installed are similarly massive both for the same reasons and also to provide the dimensional control needed to maintain the small pre-load between the bearings that has been described previously. Thus actuator arm structures known previously have relatively high mass in the central structures proximate to the pivot. This mass coupled with the stiffness of the pivot produces a resonant mode that can limit the gain of the servo which, as explained previously, can limit the minimum spacing between the recorded tracks.

In addition to this disadvantageous aspect of the mass of the pivot, this same mass also contributes a small extent to the rotational inertia of the arm which determines how fast the recording transducer can be moved to new data. This is a part of the data access time of the disk drive, so it can be seen that a further disadvantage of the ball bearing pivot is that it slows the speed of performance of the disk drive.

In order to achieve the low friction torque characteristics which has previously been explained is necessary for satisfactory operation, it has been found important to use bearings of rather high quality in respect of surface finish, race accuracy, and cleanliness of the lubricant. To ensure that adequately low friction is maintained after assembly of the pivot, the alignment of the inner and outer raceways of the two bearings must also be accurately maintained which requires that the shaft and outer bearing housing must be precision machined, and assembled under careful control. So the pivot arrangement known previously is relatively difficult to manufacture by mass production processes, and is therefore expensive.

It will be appreciated that the disadvantages described in the preceding paragraphs are linked to the use of a general purpose bearing technology which has been improved over a long period of time for a vast range of other applications all of which involve continuous rotation or relatively high specific loading or both. Yet neither of these characteristics is needed in the actuator pivot application. The functional requirements for a disk drive actuator pivot are only that it should be rigid in all degrees of freedom other than rotation, and have low or predictable friction. It is not even essential that the rotation is strictly about a fixed point.

A further important part of a disk drive actuator is the flexible electrical connection that is required between the rotating actuator and the base, in order to provide an electrical connection to the transducer heads. A typical form for this connection is as described in U.S. Pat. No. 4,933,785 issued Jun. 12, 1990 to J. H. Morehouse and titled "Disk Drive Apparatus Using Dynamic Loading/Unloading." This describes a loop of flexible "printed" circuit cable material connected to the actuator arm at one end and to a fixed support at the other. The actuator connection is chosen to be as near to the center of rotation of the pivot as is possible. This is in order to minimize the twisting moment that the loop can exert on the arm. The main purpose of reducing this twisting or biasing moment is to thereby reduce the extent to which the head is forced away from the recorded track. A secondary purpose is to minimize the power dissipated by the servo in resisting this moment. The ball bearing pivot, including as it does a shaft and outer race housing for the reasons previously described, has necessitated that the attachment of the flexible connection to the actuator cannot be very close to the center of rotation in known rotary actuators. A specific geometrical arrangement to reduce the twisting moment applied to the actuator is described in the above referenced patent. However, the patent still teaches a very long flexible cable. This illustrates that even this improved geometrical arrangement is only a partial solution to reducing the bias torque to an acceptable level.

It will be appreciated that the length required of this part increases its cost as it is manufactured from expensive materials and by an expensive process.

SUMMARY OF THE INVENTION

The present invention discloses a disk drive actuator particularly suited to recording with closely spaced tracks, and having advantages in ease and cost of manufacture. Accordingly, there are several objects and advantages of our invention.

The first of these is to provide an actuator pivot with friction torque which is very low and which may also be entirely compensated by servo control. This desirable characteristic results in one embodiment of our invention from the fact that there are only two rolling contact points and that these roll with the same rotational velocity as that of the actuator arm. Consequently there is no multiplication of the intrinsic low friction of the rolling contacts. The residual very small friction torque of this pivot is repeatable and not dependent on the prior history of motion of the arm. It may therefore be compensated by a suitable servo control method and reduced to a level that does not displace the head from the recorded track to any significant extent. In alternative embodiments of the invention in which the rolling surfaces are gear forms, or in which knife edges roll in a groove, there is a more significant amount of friction, but again because of its reproducibility it may be compensated by a servo control method.

The second object and advantage of our invention is to provide a low mass structure for the pivot that will provide higher resonant frequencies of vibration and so permit greater servo gain and provide the advantage of enabling the recorded tracks to be more closely spaced on the disk. This is achieved through the absence of ball races with their associated mass at the pivot point. The structure of the actuator arms may be reduced to simpler and lighter parts in comparison with the castings that are demanded by previously described and practiced actuator with ball races. Such a simpler structure may, for example, be constructed from simple pressed parts which may be thinner than is possible with cast construction.

The third object and advantage of our invention is to enable a form of flexible electrical connection to the actuator to be used that is of minimal length yet exerts an acceptably small twisting moment on the actuator arm. This advantage is attained by virtue of the absence of ball bearings at the pivot. The open construction exemplified in the preferred embodiment enables a flexible electrical cable to be positioned so that it passes right through the axis of rotation of the actuator. In this location the twisting moment of the cable is reduced to an absolute minimum because of the very short lever arm about the rotational axis.

An additional object and advantage of our invention is that the construction has far fewer parts than the prior art. For this reason the pivot is easier and less expensive to manufacture.

DETAILED DESCRIPTION OF THE PREFERRED EMBODIMENTS

Figure 1:
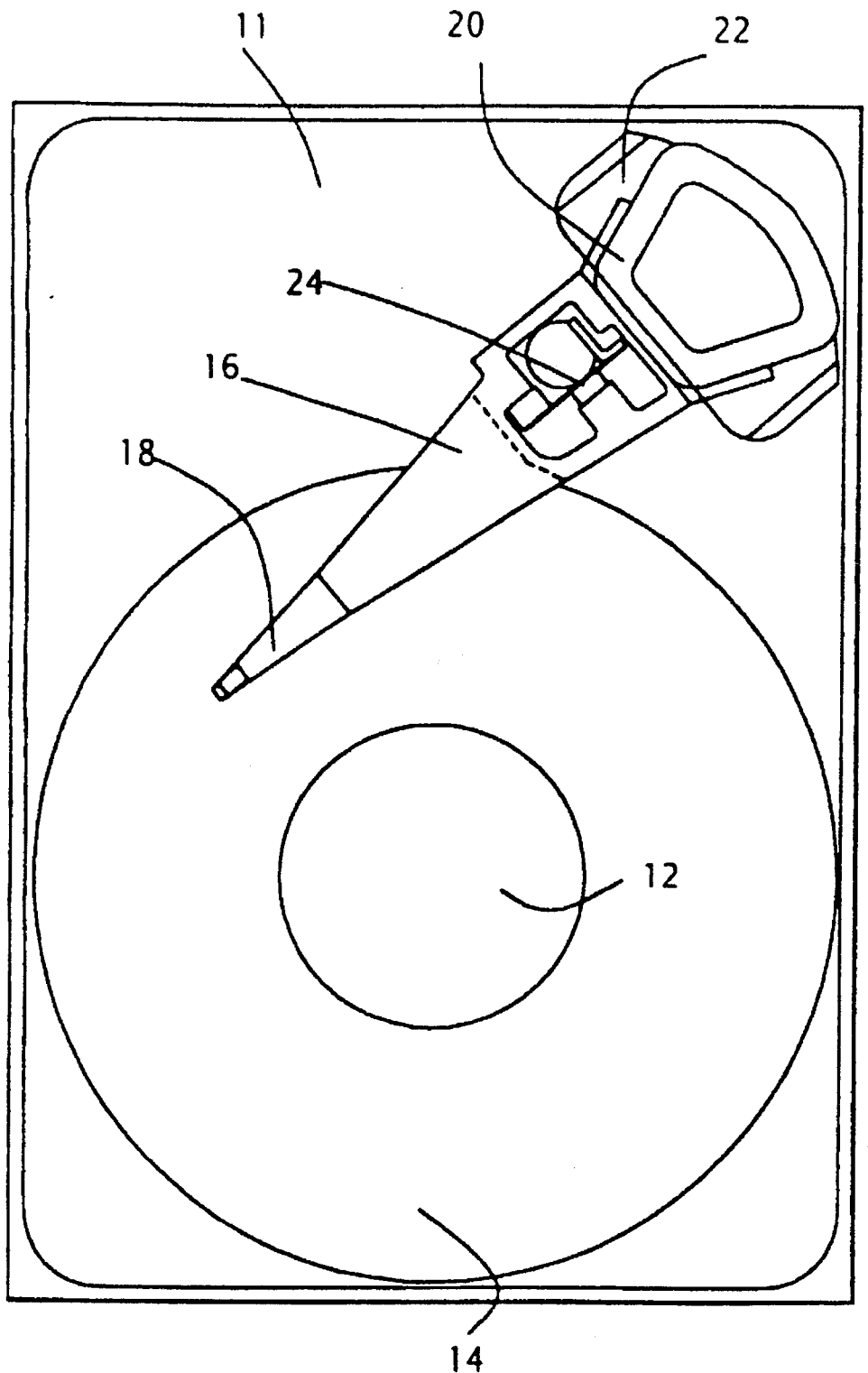
FIG. 1 is a top view of the disk drive apparatus with a rotary actuator pivot according to the present invention.

A disk drive with a rotary actuator having a pivot according to the present invention is illustrated in top view in FIG. 1.

A rectangular housing or base plate 11 supports a spindle-motor 12 on which are mounted one or more disks 14. Also mounted on the base is a pivot 24, which is the principal subject of this invention, carrying an actuator arm assembly 16. Each individual arm of assembly 16 carries at its end one or two suspended transducer heads 18 arranged so that there is one head on each disk surface. Actuator arm assembly 16 includes at its other end an actuator coil 20 through which current is passed for causing rotational movement of the actuator assembly. A magnet structure 22, often called a voice coil magnet, surrounds the coil 20 and is attached to base plate 11.

Figure 2:
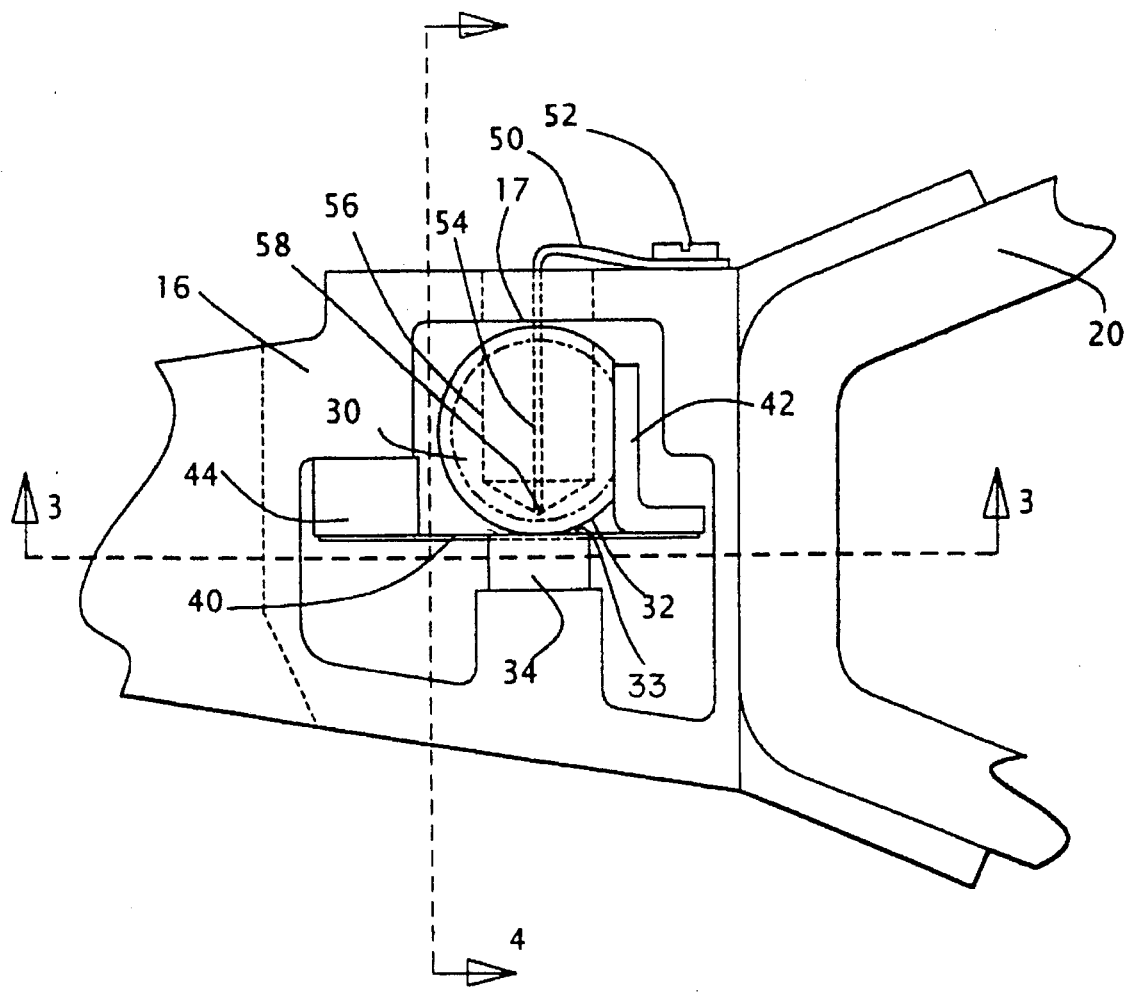
FIG. 2 is a top view of one preferred embodiment of the actuator pivot according to the present invention.
Figure 3:
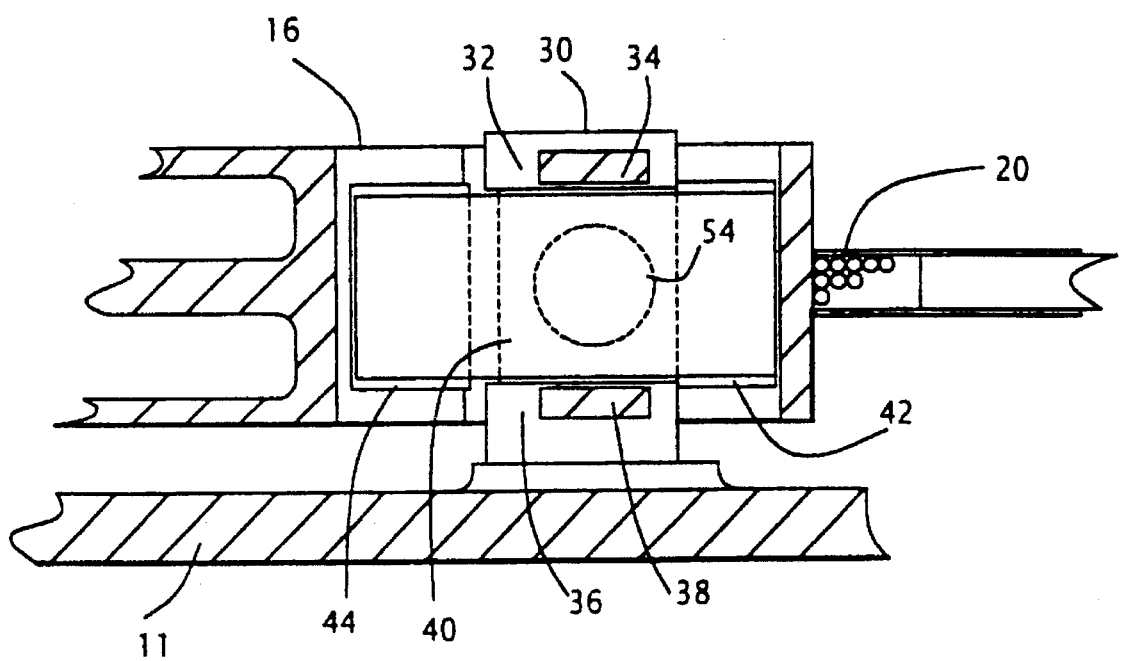
FIG. 3 is a cross-sectional view of the pivot of FIG. 2 in the plane of line 3—3.
Figure 4:
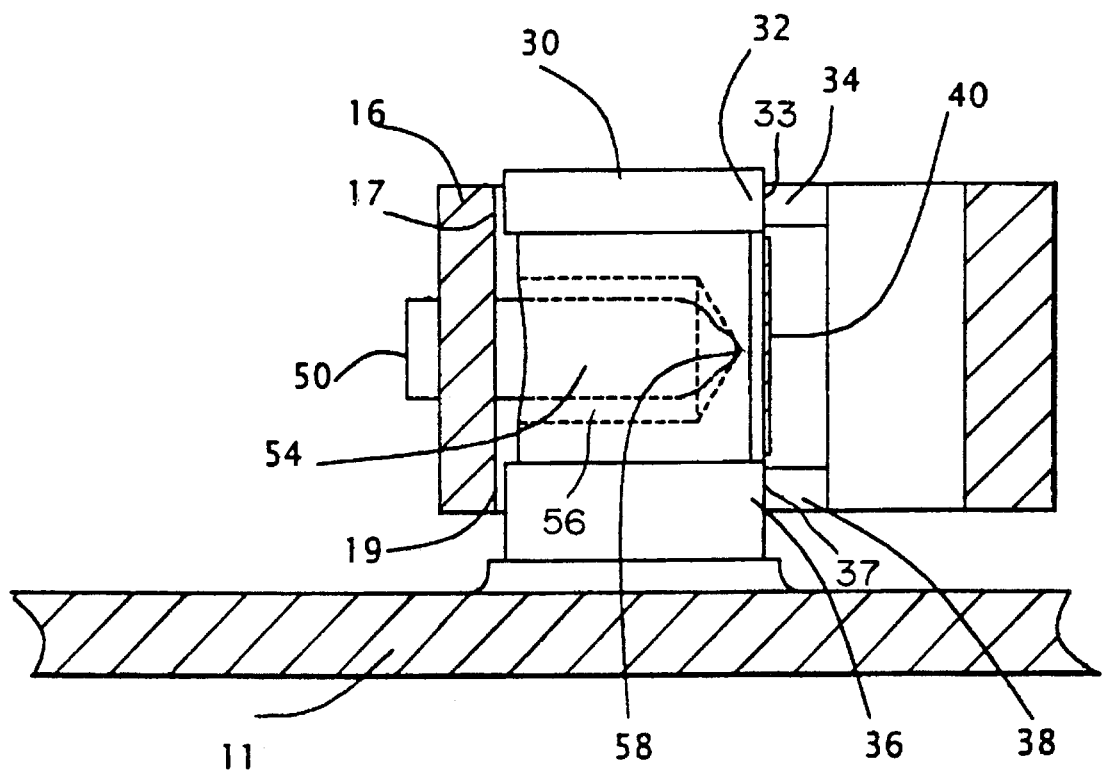
FIG. 4 is an end view of the pivot of FIG. 2 in the plane of line 4—4.

A preferred embodiment of the pivot of the present invention is illustrated in FIGS. 2, (top view) 3 (side view) and 4 (end view). FIG. 4 shows a pillar or mounting device 30 of generally circular section which is fixed to base plate 11 and which has two smooth surfaces 32 and 36 at the top and bottom respectively. These surfaces are in contact with surfaces 33 and 37 of two corresponding rockers 34 and 38 which are attached to arm 16. FIG. 2 depicts the plane in which the rocking occurs. A leaf spring or resilient bias device 50 is attached to arm 16 by a screw 52, and has a straight section 54 intruding into a hole or cavity 56 in pillar 30. Spring 50 pushes against the bottom 58 of cavity 56 at which point spring 50 is shaped so that it may rock without significant wear or friction. The direction of deflection of spring 50 is to keep surfaces 32 and 36 of the pillar 30 in contact with surfaces 33 and 37 of rockers 34 and 38. A thin flexure plate 40 is attached to pillar 30 by fixed flexure mounting 42. The free end of flexure plate 40 is attached to arm 16 by a rotating flexure mounting 44. FIGS. 3 and 4 show how flexure plate 40 is of rectangular shape and is located between the surfaces 32 and 36 of pillar 30 and also between rockers 34 and 38. The flexure plate 40 does not contact any parts of the mechanism except at mountings 42 and 44. FIG. 2 illustrates how actuator arm 16 has an interior surface 17 that is in close proximity to pillar 30 in a manner which limits the separation that may occur between the surface 32 of pillar 30 and the rocker 34 to a very small distance. FIG. 4 illustrates how the same arrangement of close proximity at lower interior surface 19 restricts the separation that may occur between the surface 36 of pillar 30 and rocker 38.

Figure 5:
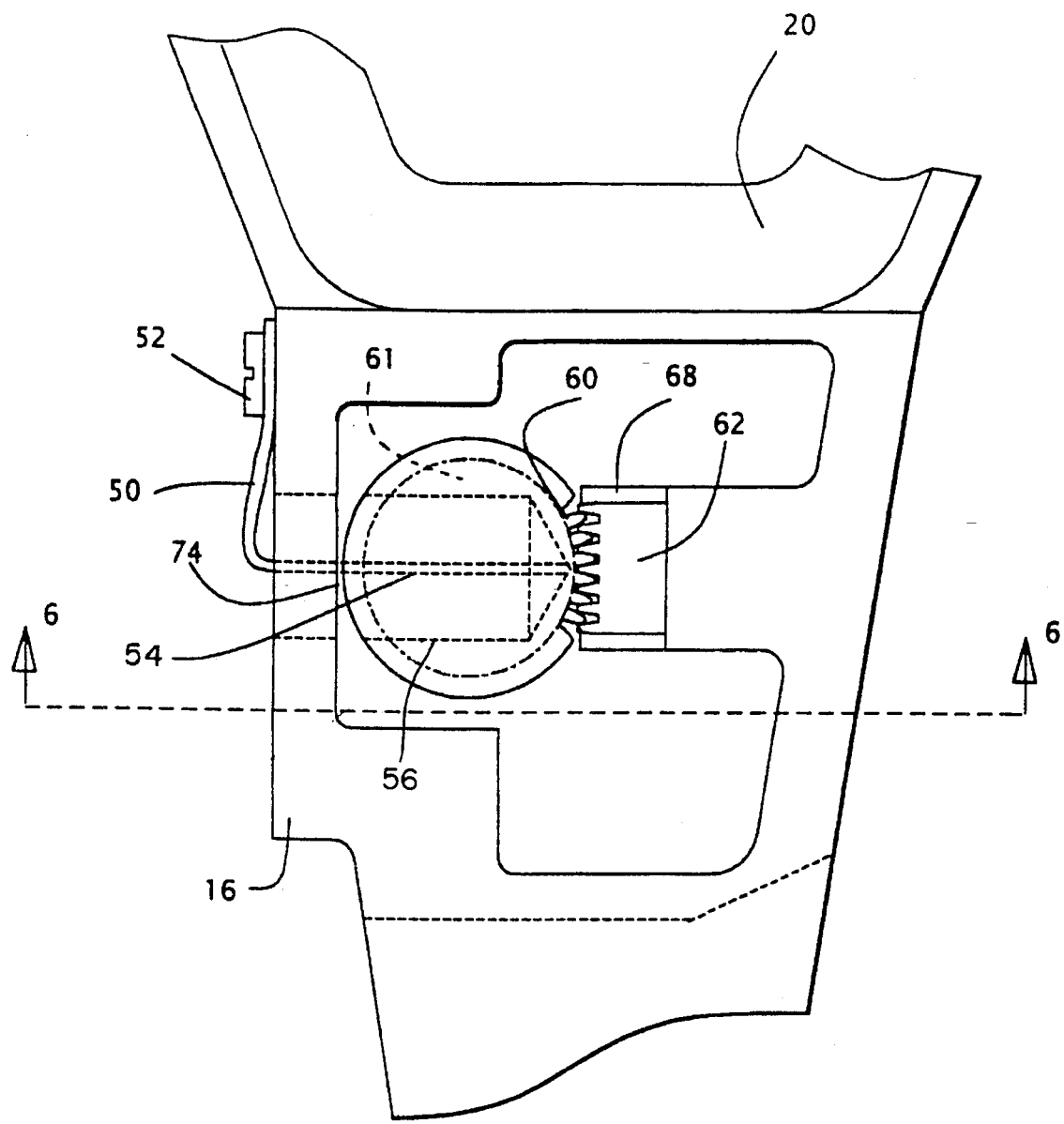
FIG. 5 is a top view of a first alternative embodiment of the actuator arm pivot of the present invention in which the rocking surfaces have gear forms.

A first alternative embodiment of the invention is illustrated in FIG. 5. The general arrangement of parts is similar to that of the first embodiment, except that the rockers and pillar have matching gear forms which are engaged with each other. A pillar 61 attached to base plate 11 has a gear form 60 at its top end. Gear form 60 has sufficient teeth to accommodate a total rotation of arm 16 about it of about thirty degrees. Rotating gear form 62 which in the illustration is shown as a rack (or straight gear) is attached to arm 16 and engages gear form 60. Gear form 62 also has only a few teeth for the same reason.

Figure 6:
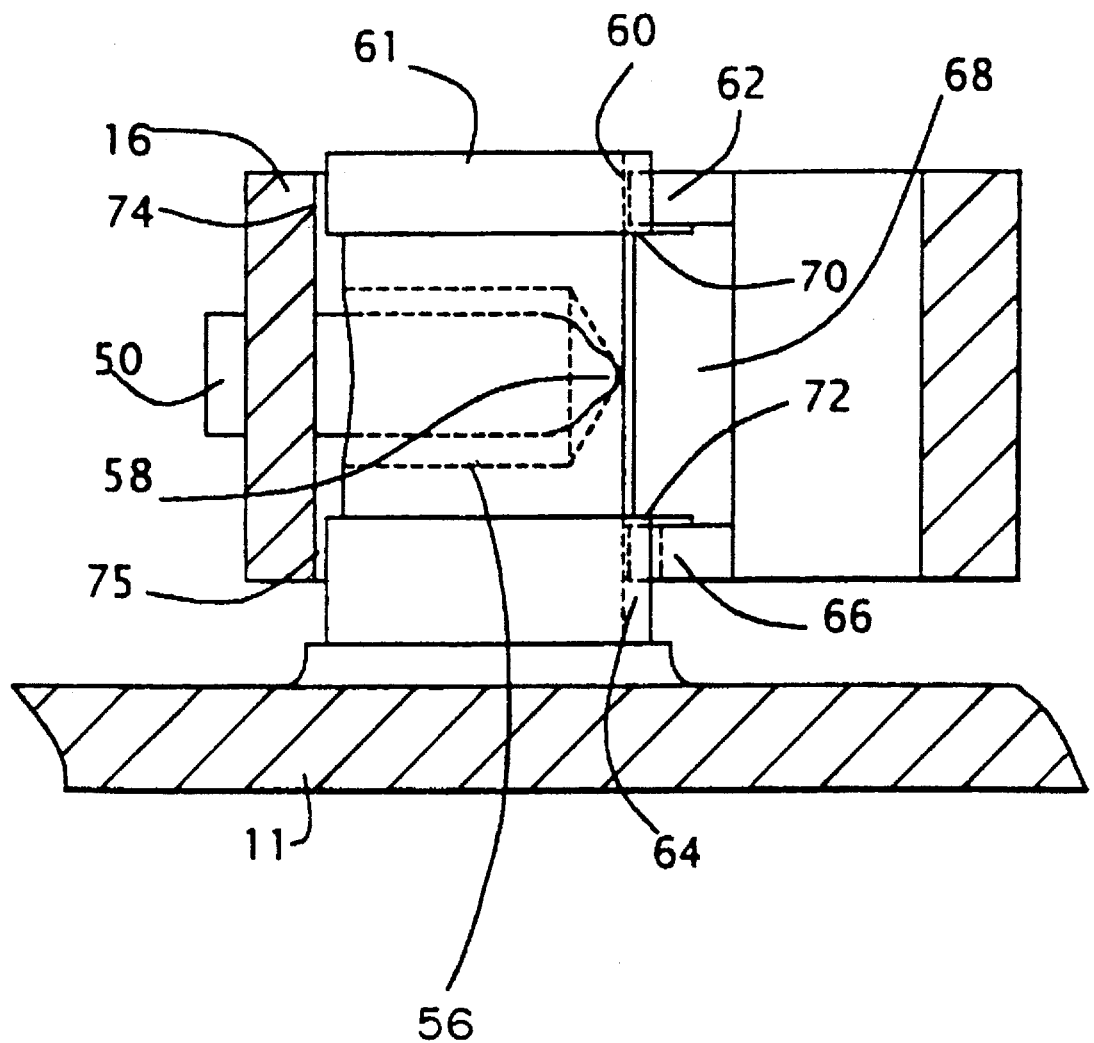
FIG. 6 is an end view of the embodiment of FIG. 5 in the plane of line 6—6.

FIG. 6 illustrates that a gear form 64 cut into pillar 61 at the bottom end thereof coaxial with gear form 60 engages corresponding gear form 66 attached to arm 16. Spring 50 intruding into cavity 56 in pillar 61 has the same feature as previously described for the first embodiment and applies force in a direction to keep the gear forms engaged. A locating block 68 which is best shown in FIG. 6 is fixed to arm 16. Block 68 is mounted between top and bottom fixed gear form surfaces 62 and 66 and is a close fit at points 70 and 72. Motion of actuator arm 16 is constrained by the action of locating block 68 against the sides of the gears at points 70 and 72. By virtue of locating block 68 and gear forms 62 and 66, a flexure is not required for this embodiment. In an identical manner to that of the first embodiment, close clearance between arm 16 and the surfaces of pillar 61 at points 74 and 75 restrict the separation possible between gear forms 60 and 62 also between gear forms 64 and 66.

Figure 7:
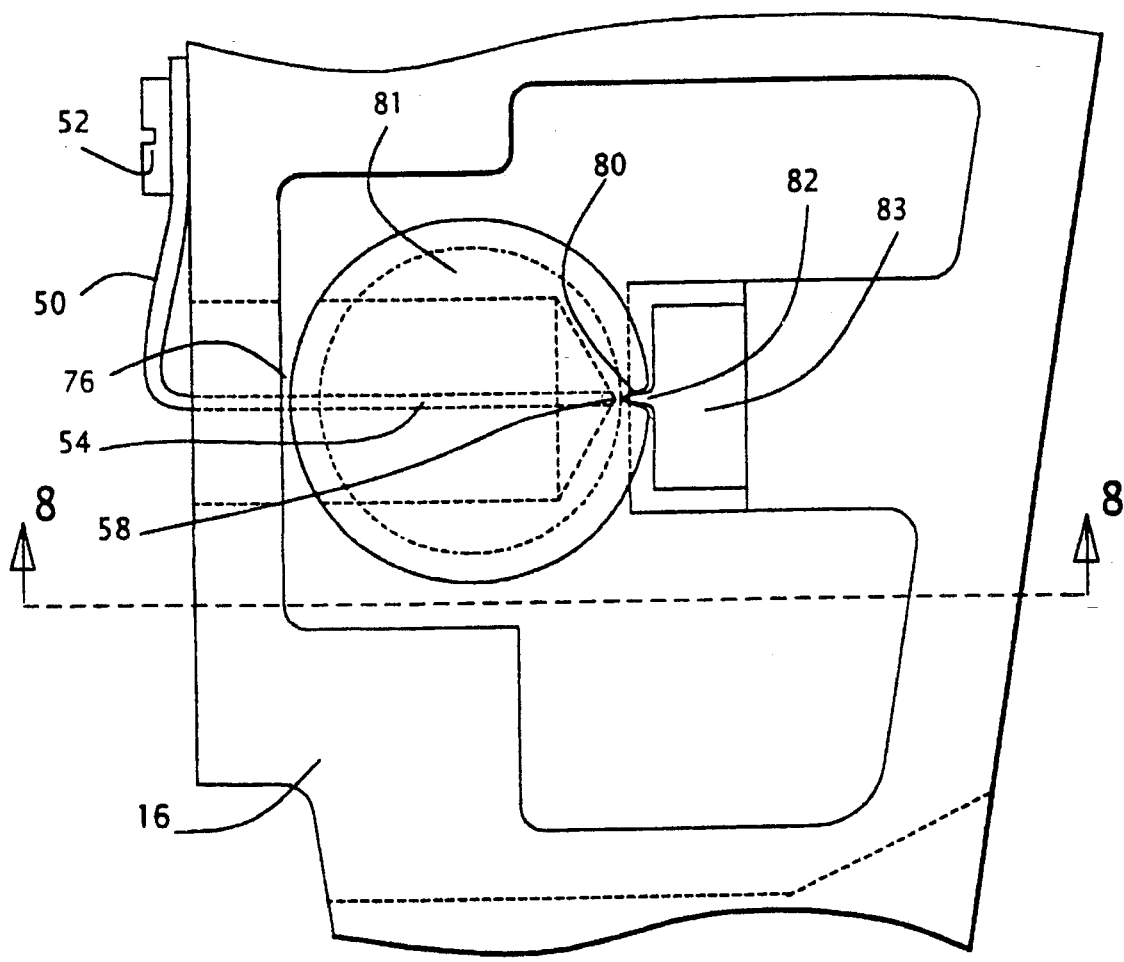
FIG. 7 is a top view of a second alternative embodiment of the actuator arm pivot of the present invention in which the rocking surfaces have knife edges.
Figure 8:
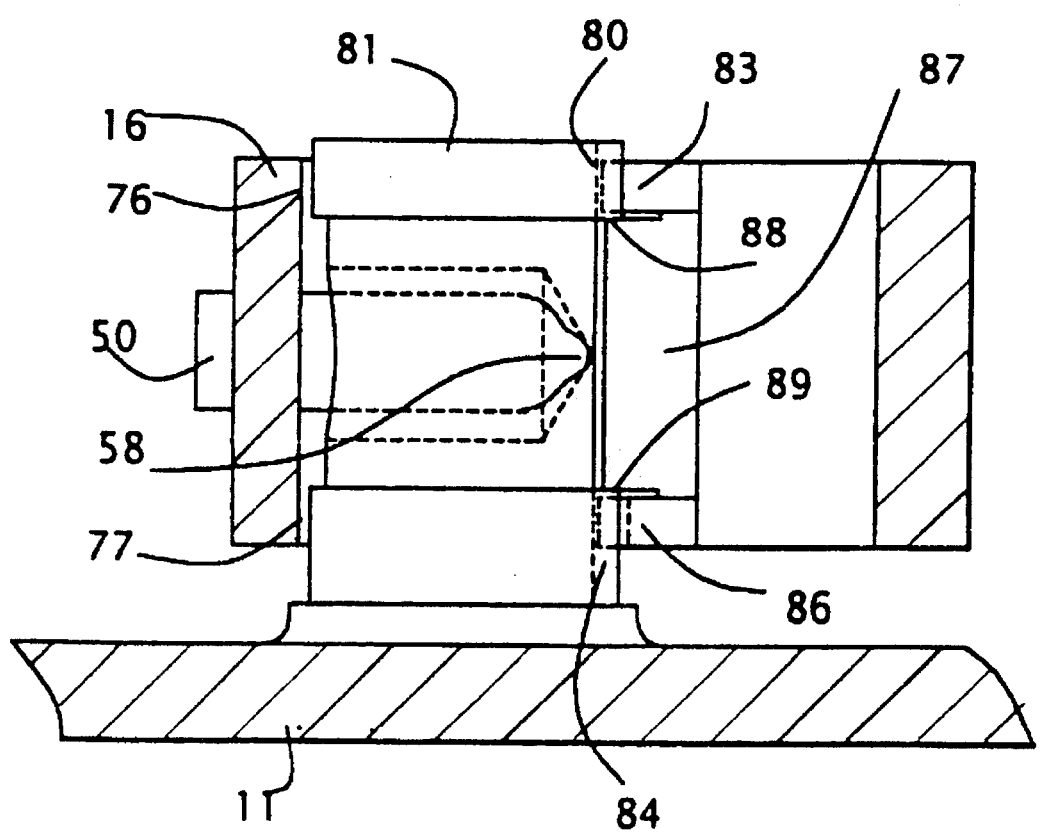
FIG. 8 is an end view of the embodiment of FIG. 7 in the plane of line 8—8.

A second alternative embodiment, having similarity with the first alternative embodiment described above, is illustrated in FIGS. 7, 8 and 9. FIG. 7 shows a pillar 81 which has at its top end a grooved surface 80. A knife edged protrusion 82, formed from a member 83 attached to arm 16, is in engagement with groove 80. A corresponding aligned groove surface 84 is located at the bottom of the pillar 81 as shown in FIG. 8, into which engages with a knife edge protrusion formed from member 86. A locating block 87 similar to block 68 is interposed between members 83 and 86 to have a close fit between radial edges 88 and 89 of the two raised grooved surfaces 80 and 84 of the pillar 81.

Figure 9:
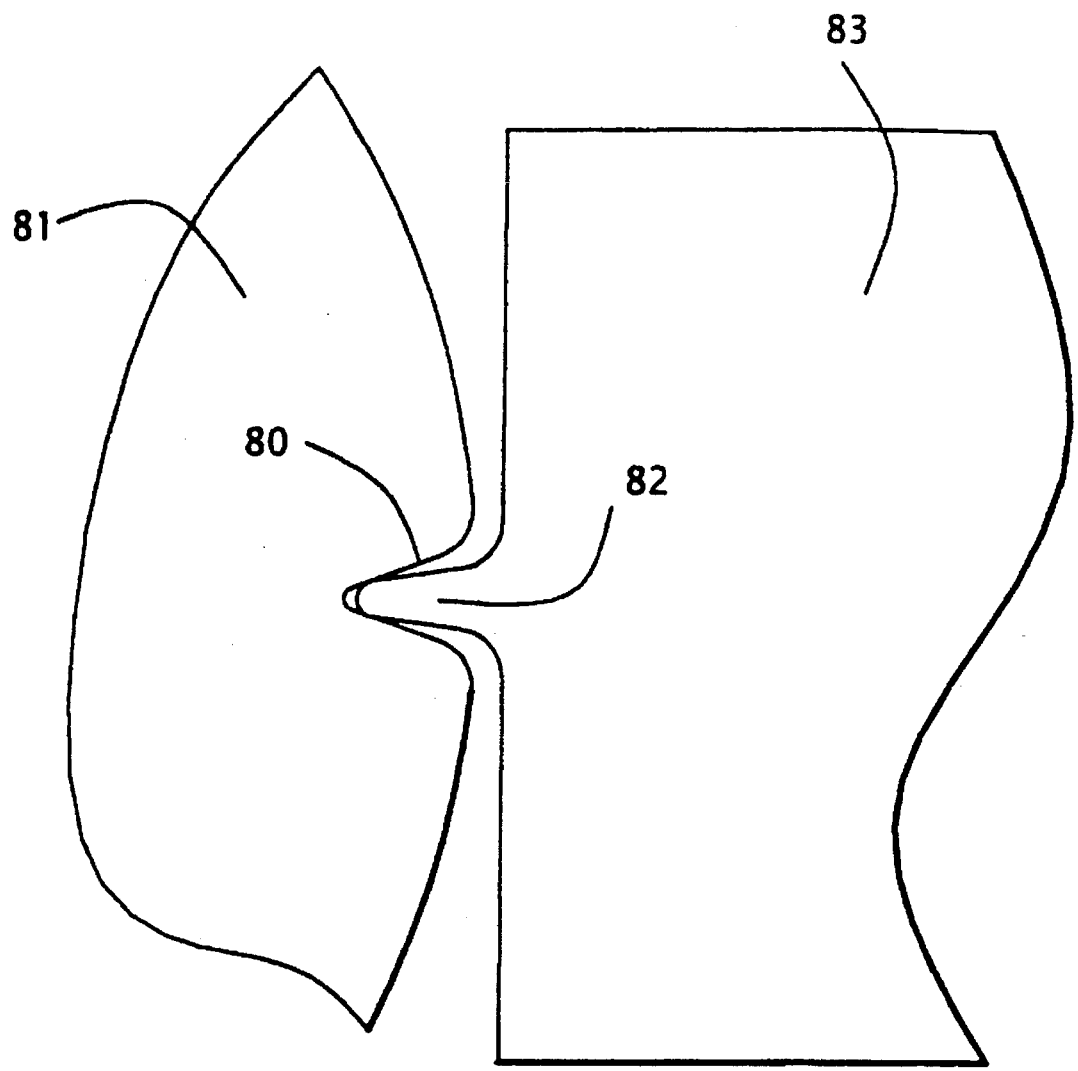
FIG. 9 is an enlarged view of a knife edge.

FIG. 9 shows knife edge 82 and groove 80 in greater detail, illustrating that knife edge 82 is not infinitely sharp but has a small radius at its tip. Groove 80 has straight sides and a radius at its end which is less than the radius of the knife edge. Groove 80 and knife edge 82 therefore contact along two lines of contact. The included angle of the groove is greater than the included angle of the knife edge by an amount which is more than the angle through which the actuator arm rotates. In an identical manner to that described for the first embodiment, close clearance between arm 16 and the surfaces of pillar 81 at points 76 and 77 in FIG. 8 restricts the separation possible between groove 80 and knife-edge member 83 and also between groove 84 and knife edge member 86.

Figure 10:
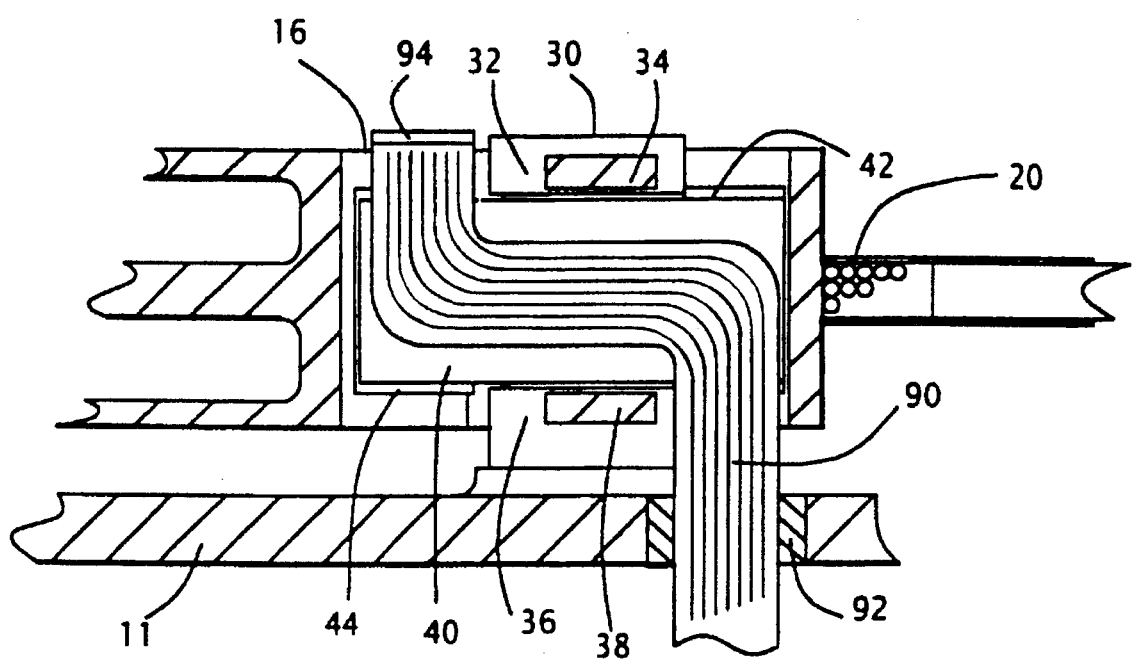
FIG. 10 is a side view in cross section illustrating how a flexible electrical cable connection is routed through the pivot mechanism according to the present invention.

FIG. 10 shows a flexible printed circuit cable 90 routed through the preferred embodiment of the invention. Cable 90 is shaped so that it may be attached to fixed flexure mounting 42 and to rotating flexure mounting 44. Between attachments to mountings 42 and 44, cable 90 bends as actuator arm 16 rotates. One end of flexible cable 90 passes to the exterior of the disk drive through seal 92 in base plate 11. End 94 of cable 90 is connected to leads (not shown) from heads 18 and actuator coil 20.

The manner of operation of the pivot of the present invention in each of the embodiments that have been described is basically similar. The operation of the first preferred embodiment will be described first and then the differences in the alternative embodiments will be explained.

Movement of the actuator arm 16 under the control of the current in the coil 20 is constrained to be of a rocking nature which takes place between rocking surfaces 32 and 36 of pillar 30 on the one hand and surfaces 33 and 37 of rockers 34 and 38 on the other hand. The point of contact between the rockers, which is also the instantaneous center of rotation of the arm, moves a small distance as the angle of the actuator arm is changed. It is very important that the rockers remain in contact for the correct operation of this invention.

This is ensured by leaf spring 50. Spring 50 is proportioned to apply a bias force sufficient to prevent the rockers from losing contact with the pillar surfaces during normal operation. The force is shared equally between the rocker pairs since spring 50 is located centrally between the rocker pairs. The spring force is not sufficient to prevent separation of the rockers under the forces which exist instantaneously under shock conditions however. Under shock the surfaces 17 and 19 of arm 16 which are closely spaced from pillar 30 ensure that the rocker surfaces cannot become widely separated. The clearances are determined to ensure that free motion of arm 16 under shock is limited only to that which will not cause damage to disk 14, heads 18, or to other parts of the drive. It is also important to the best operation of the invention that the force exerted by spring 50 does not exert a significant turning moment about the pivot. This is because a turning moment will disturb the accuracy with which the recording head follows the recorded tracks. This turning moment is minimized in the illustrated embodiments of the invention by the geometrical location of the point of contact 58 of spring 50 with pillar 16. Firstly the force is directed to pass nominally through the rotational axis of the mechanism so that the force has a very small lever arm. Secondly the point of application of the force 58 is very close to the axis of rotation. This ensures that angular errors will not result in significant deviations of the line of action of the force away from the rotational axis. The pairs of rockers, which as explained remain in contact under the bias force of the leaf spring 50, consequently define the location and the orientation of the axis of rotation of the actuator arm assembly 16. The fact that the rocker pairs are in contact also prevents twisting of the arm assembly about an axis along its length.

The rocker pairs although in contact may easily slip with respect to each other in the plane of contact. Because of this flexure plate 40 is provided to constrain all of the other degrees of freedom of motion of the arm. Specifically flexure plate 40 constrains motion along the arm length, motion along the axis of rotation, and twisting motion about the axis orthogonal to the plane of the flexure. Thus the actuator arm 16 may also rotate about the intended rotational axis. In order for flexure plate 40 to provide these constraints on the motion of the arm 16 with respect to base plate 11 without causing slip between the rocking surfaces, it is important that flexure plate 40 should be in a particular position. This correct position, shown in FIG. 2, is with the flexure plate 40 being in the plane of the points of contact of the rocker pairs, when flexure plate 40 is flat.

Operation of the first alternative embodiment of the invention is similar to that of the preferred embodiment of FIG. 2, except that the pairs of gear-form surfaces 60 and 62 and also 64 and 66 may not slip as rocking motion of arm 16 takes place. This is because of the positive engagement of the mating teeth of the gear forms. Because of this positive engagement, motion of arm 16 is prevented in all degrees of freedom of motion except in rotation about the intended axis. A flexure plate is therefore not required for this embodiment.

Operation of the second alternative embodiment of the invention is also similar to that of the preferred embodiment of FIG. 2, but in this case the engagement of knife-edge bodies 83 and 86 with grooved surfaces 80 and 84 prevents relative slip between them. Because of this positive engagement, motion of arm 16 is prevented in all degrees of freedom of motion except in rotation about the intended axis. A flexure plate is therefore not required for this embodiment.

It should be noted that to the extent friction is inevitable between gear forms and also at the points of contact of a knife edge as described previously, the alternative embodiments of this invention will have higher friction than the first preferred embodiment. It may be recalled that only the unpredictable element of friction causes the transducer head to be disturbed from following the recorded track on the disk. Consequently there are some types of disks in which the net advantage of one embodiment over another may be in favor of the alternative embodiments that have been described.

Accordingly it will be seen that our invention provides a simple manner of providing a pivot for a rotary disk drive actuator that has several advantages over the pre-loaded pair of ball bearings which are the present state of the art:

It provides all of the functions required of an actuator pivot yet does not demand high precision in any of its parts;

It is free of the variable and unpredictable component of friction torque possessed by ball bearings; and It enables electrical connections to be made to the actuator which are of much reduced length in comparison with previously described and practiced actuators of flex circuit material.

While preferred embodiments of the invention have been described above, the actuator can have a different number of arms to suit a different number of disks, and it can be constructed in a different shape. The detailed fabrication of the structure could be by methods other than those implied above. The geometry of the mechanism could be transposed from one side of the axis of rotation to the other. The construction of the disk drive could be of any alternative form. The disk drive is shown as using magnetic recording, but any other means such as optical recording would be applicable to this invention. A spring is shown applying the force to keep the rockers in contact, but this force can be exerted by other form of spring, or magnetically, or by any other means. The rockers are shown as specific parts of the structure, but they may be integral with other parts. The shape of the rockers may be of any form that provides the surface conformity necessary for rocking motion. The materials of construction of the various parts may be of various combinations of plastics, metals, composites, ceramics, jewel-like minerals, or any other material.

The invention having been thus described, it be apparent to those skilled in the art that the same may be varied in many ways without departing from the spirit and scope of the invention. Any and all such modifications which would be obvious to those skilled in the art are intended to be covered by the following claims.

We claim:

1. A disk drive apparatus, comprising:

a housing;

a disk for storing data;

an actuator arm assembly having a transducer mounted thereon for writing and reading data to and from said disk;

a mounting device attached to said housing;

rocker means provided on said actuator arm assembly for engaging said mounting device with a rolling contact motion;

a resilient bias device engaging said actuator arm assembly and said mounting device, for biasing said rocker means into engagement with said mounting device; and constraining means, connected between said rocker means and said mounting device, for constraining all motion between said rocker means and said mounting device other than said rolling contact motion.

2. A disk drive apparatus according to claim 1, wherein said constraining means is a flexure plate attached to said mounting device and to said actuator arm assembly.

3. A disk drive apparatus according to claim 2, further including a flexible cable providing external electrical connection to said transducer, said flexible cable being located adjacent said flexure.

4. A disk drive apparatus according to claim 1, wherein said constraining means comprises a plurality of gear teeth formed on said rocker means and on said mounting device and interlocking with each other.

5. A disk drive apparatus according to claim 1, wherein said constraining means comprises a knife edge formed on one of said rocker means and said mounting device and a groove formed in the other of said rocker means and said mounting device, said knife edge engaging said groove during said rolling contact motion.

6. A disk drive including an actuator arm assembly and a mounting device on which said arm assembly is pivotally mounted for movement about a pivot axis;

said arm assembly having at least one rocker member with an abutment surface;

said mounting device comprising a pillar member extending along said pivot axis and having a fixed abutment surface;

said arm assembly being mounted on said mounting device with said rocker member abutment surface abutting said fixed abutment surface in rolling engagement with said fixed abutment surface; and a resilient bias device engaging said actuator arm assembly and said mounting device to urge said rocker member abutment surface into contact with said fixed abutment surface, and a flexible restraining member secured both to said mounting device and to said arm assembly to prevent slip of said rocker member with respect to said pillar member while permitting pivotal movement of said actuator arm about said pivot axis.

7. A disk drive according to claim 6 in which said rocker member comprises two abutment surfaces spaced apart from each other in a direction along said pivot axis.

8. A disk drive according to claim 7 in which each of said two abutment surfaces comprises a flat abutment surface and said fixed abutment surface comprises a cylindrical surface wherein each flat abutment surface abuts said cylindrical surface along a line parallel to said pivot axis.

9. A disk drive according to claim 6 in which said flexible restraining member comprises a flexure plate secured at opposite edges thereof to said mounting device and to said arm assembly respectively.

10. A disk drive according to claim 9 in which said rocker member comprises two abutment surfaces spaced apart from each other in a direction along said pivot axis and said flexure plate is located between said two abutment surfaces.

11. A disk drive including an actuator arm assembly and a mounting device, said arm assembly being pivotally mounted on the mounting device for movement about a pivot axis and extending in a first direction away from the pivot axis and perpendicular to the pivot axis;

said arm assembly having at least one rocker member with an abutment surface facing in a second direction transverse to said pivot axis;

said mounting device comprising a pillar member extending along said pivot axis and having a fixed abutment surface facing said rocker member abutment surface;

said arm assembly being mounted on said mounting device with said rocker member abutment surface abutting said fixed abutment surface in rolling engagement with said fixed abutment surface; and a resilient bias device engaging said actuator arm assembly and said mounting device to urge said rocker member abutment surface into contact with said fixed abutment surface, and a flexible restraining member secured both to said mounting device and to said arm assembly to prevent slip of said rocker member with respect to said pillar member while permitting pivotal movement of said actuator arm about said pivot axis.

12. A disk drive according to claim 11 in which the flexible restraining member comprises a flexure plate in a plane parallel to the pivot axis and parallel to said first direction.

13. A disk drive including an actuator arm assembly and a mounting device, said arm assembly being pivotally mounted on the mounting device for movement about a pivot axis and extending in a first direction away from the pivot axis and perpendicular to the pivot axis;

said arm assembly having a read/write transducer mounted thereon and at least one rocker member with an abutment surface facing in a second direction transverse to said pivot axis;

said mounting device comprising a pillar member extending along said pivot axis and having a fixed abutment surface facing said rocker member abutment surface;

said arm assembly being mounted on said mounting device with said rocker member abutment surface abutting said fixed abutment surface in rolling engagement with said fixed abutment surface; and a resilient bias device engaging said actuator arm assembly and said mounting device to urge said rocker member abutment surface into contact with said fixed abutment surface, and a flexure plate secured at opposite edges thereof to said mounting device and to said arm assembly respectively to prevent movement between said arm assembly and said mounting device other than pivotal movement of said actuator arm about said pivot axis.

\* \* \* \* \*